(12) United States Patent
Svoboda et al.

(10) Patent No.: US 9,692,817 B2
(45) Date of Patent: *Jun. 27, 2017

(54) SYSTEM AND METHOD FOR FLEXIBLE HOLDING STORAGE DURING MESSAGING

(71) Applicant: RED HAT, INC., Raleigh, NC (US)

(72) Inventors: Rostislav Svoboda, Slapanice (CZ); Pavel Slavicek, Brno (CZ); Filip Nguyen, Brno (CZ)

(73) Assignee: RED HAT, INC., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/359,450

(22) Filed: Nov. 22, 2016

(65) Prior Publication Data

US 2017/0078378 A1 Mar. 16, 2017

Related U.S. Application Data

(63) Continuation of application No. 13/967,139, filed on Aug. 14, 2013, now Pat. No. 9,537,810.

(51) Int. Cl.
*G06F 15/16* (2006.01)
*H04L 29/08* (2006.01)

(52) U.S. Cl.
CPC ...... *H04L 67/1014* (2013.01); *H04L 67/1097* (2013.01); *H04L 67/2842* (2013.01)

(58) Field of Classification Search
None
See application file for complete search history.

(56) References Cited

U.S. PATENT DOCUMENTS

| 6,687,848 B1 | 2/2004 | Najmi |
| 7,583,861 B2 | 9/2009 | Hanna et al. |
| 7,962,582 B2 | 6/2011 | Potti et al. |
| 2003/0172077 A1 | 9/2003 | Moussavian |

(Continued)

FOREIGN PATENT DOCUMENTS

WO 02096056 11/2002

OTHER PUBLICATIONS

Debasish Ghosh, "Multiparadigm Data Storage for Enterprise Applications," pp. 57-60, Sep./Oct. 2010 Issue IEEE Software, www.computer.org/software.

(Continued)

*Primary Examiner* — Padma Mundur
(74) *Attorney, Agent, or Firm* — Haynes & Boone, LLP (57) ABSTRACT

A system and method of flexible holding storage during messaging includes determining one or more properties of a message, the message to be stored in a holding storage area of a messaging system, determining status of one or more candidate holding storage devices, determining one or more storage selection rules, adjusting the one or more storage selection rules based on information associated with the status of the one or more candidate holding storage devices, and selecting a holding storage device for the message from the candidate holding storage devices based on the adjusted storage selection rules and information associated with the properties of the message. The one or more storage selection rules express preferences among the one or more candidate holding storage devices. In some examples, the system and method further include sending the message to the selected holding storage device.

20 Claims, 5 Drawing Sheets

(56) References Cited

U.S. PATENT DOCUMENTS

2011/0099558 A1     4/2011   Patrick et al.
2013/0346537 A1*   12/2013   Fitzpatrick .......... H04L 67/1097
                                                                                                          709/213

OTHER PUBLICATIONS

Luis Garces-Erice, "Builidng an Enterprise Service Bus for Real-Time SOA: A Messaging Middleware Stack", IBM Zurich Res. Lab./33rd Annual IEEE International Computer Software and Applications Conference, 2009, pp. 79-84.

* cited by examiner

| Keyword | Description | Operators |
|---|---|---|
| $SIZE | Message size | >, <, =, etc. |
| $TYPE | Message type/encoding | =, in, BYTE, TEXT |
| $HEADER | Contents of message header | contains, isPresent |
| $DESTINATION | Queuing mechanism type | =, QUEUE, TOPIC |
| $CLIENT_ID | Custom client properties | = |
| ⋮ | ⋮ | ⋮ |

*FIG. 4*

```
W-001 = WEIGHT(HDD, "$SIZE < 100 && $SIZE > 10 && $TYPE=TEXT") = 31
W-002 = WEIGHT(HDD, "$TYPE = BYTE") = 60
W-003 = WEIGHT(MEMORY, "$DESTINATION = QUEUE && $HEADER('asd').isPresent()") = 80
W-004 = WEIGHT(MEMORY, "$CLIENT_ID = 'privileged'") = 90
W-005 = WEIGHT(MEMORY, "$SIZE < 20") = 80
W-006 = WEIGHT(DB1, "$HEADER('locator').contains('fast_db')") = 60
W-007 = WEIGHT(DB2, "$HEADER('locator').contains('slow_db')") = 60
    ⋮      ⋮                  ⋮
W-999 = WEIGHT(GRID, "$SIZE > 10000") = 90
```

SYSTEM AND METHOD FOR FLEXIBLE HOLDING STORAGE DURING MESSAGING

CROSS-REFERENCE TO RELATED APPLICATIONS

This application is a continuation of U.S. patent application Ser. No. 13/967,139, filed Aug. 14, 2013, which is hereby incorporated by reference. In its entirety.

BACKGROUND

The present disclosure relates generally to computing systems, and more particularly to flexible holding storage during messaging.

As the value and use of information continues to increase, individuals and businesses seek additional ways to process and store information. One option is a computing system. Computing systems may vary in complexity from a single processor operating in relative isolation to large networks of interconnected processors. The interconnected processors may be in close proximity to each other or separated by great distances both physically and as distance is measured in computer networking terms. The interconnected processors may also work together in a closely cooperative fashion or in a loose weakly coupled fashion. Because technology and processing needs and requirements may vary between different applications, the structure and arrangement of the computing system may vary significantly between two different computing systems. The flexibility in computing systems allows them to be configured for both specific users, specific uses, or for more general purposes. Computing system may also include a variety of hardware and software components that may be configured to process, store, and communicate information based on the needs of the users and the applications.

Additionally, some examples of computing systems include non-transient, tangible machine-readable media that include executable code that when run by one or more processors, may cause the one or more processors to perform the steps of methods described herein. Some common forms of machine readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Computers, processors, and software systems often share information and communicate with each other using messaging. In many situations, the messaging is handled in an asynchronous fashion using an intermediary messaging system. This allows a message producer or sender to generate and send a message without having to establish a communication channel directly with the message consumer or receiver. This provides many advantages for the messaging as the producer is able to generate and send a message without having to address processing speed, buffering differences, and the like between itself and the consumer, but rather delegates that responsibility to the messaging system. This approach further allows the producer to send messages even when the consumer is offline.

In order to support this asynchronous messaging, the messaging system typically uses some type of holding storage to hold onto the message between the time it is received from the producer and the time it is delivered to the consumer. The use of this holding storage may also support the ability to send the message to multiple consumers. Most messaging systems take a simplistic approach to the holding storage by utilizing a holding storage type and capacity selected by an administrator based on anticipated message volumes, types, sizes, and length of time messages are expected to be in held in the holding storage. The efficiency and utilization of the messaging system, however, may be sensitive to message properties, such as type and size, as well as the changing status of the holding storage. As a consequence, this may make the one-size-fits-all approach to holding storage less than ideal for many messaging systems in practice.

Accordingly, it would be desirable to provide improved holding storage for messaging systems.

SUMMARY

According to one example, a method of selecting a holding storage device includes determining one or more properties of a message, the message to be stored in a holding storage area of a messaging system, determining status of one or more candidate holding storage devices, determining one or more storage selection rules, adjusting the one or more storage selection rules based on information associated with the status of the one or more candidate holding storage devices, and selecting a holding storage device for the message from the candidate holding storage devices based on the adjusted storage selection rules and information associated with the properties of the message. The one or more storage selection rules express preferences among the one or more candidate holding storage devices.

According to another example, a messaging system includes an interface for receiving messages, one or more storage interfaces for coupling the messaging system to one or more holding storage devices, one or more storage selection rules, a storage monitor for monitoring the one or more holding storage devices to determine a status of each of the one or more holding storage devices, and a rule evaluator for evaluating the one or more storage selection rules. Each of the storage selection rules is associated with one of the one or more holding storage devices and expresses a preference for the associated holding storage device based on properties of received messages. The messaging system determines one or more properties of a received message, adjusts the preferences of each of the storage selection rules based on information associated with the status of a corresponding one of the holding storage devices, uses the rule evaluator to evaluate the one or more storage selection rules based on information associated with the determined properties of the received message, selects a first holding storage device from the holding storage devices based on results of the rule evaluation, and sends the message to the first holding storage device using a corresponding one of the storage interfaces for temporary holding until the message can be sent to one or more recipients.

According to yet another example, a non-transitory machine-readable medium comprising a first plurality of machine-readable instructions which when executed by one or more processors associated with a messaging system are adapted to cause the one or more processors to perform a method including receiving a message from a producer, the message to be stored in a staging area of the messaging system, determining one or more characteristics of the message, determining status of one or more first storage devices, determining one or more storage device rules, adjusting the one or more storage device rules based on information associated with the status of the one or more first storage devices, selecting a second storage device for the message from the first storage devices based on the adjusted storage device rules and information associated with the characteristics of the message, and sending the message to the second storage device. The one or more storage device rules express preferences among the one or more first storage devices.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Figure 1:
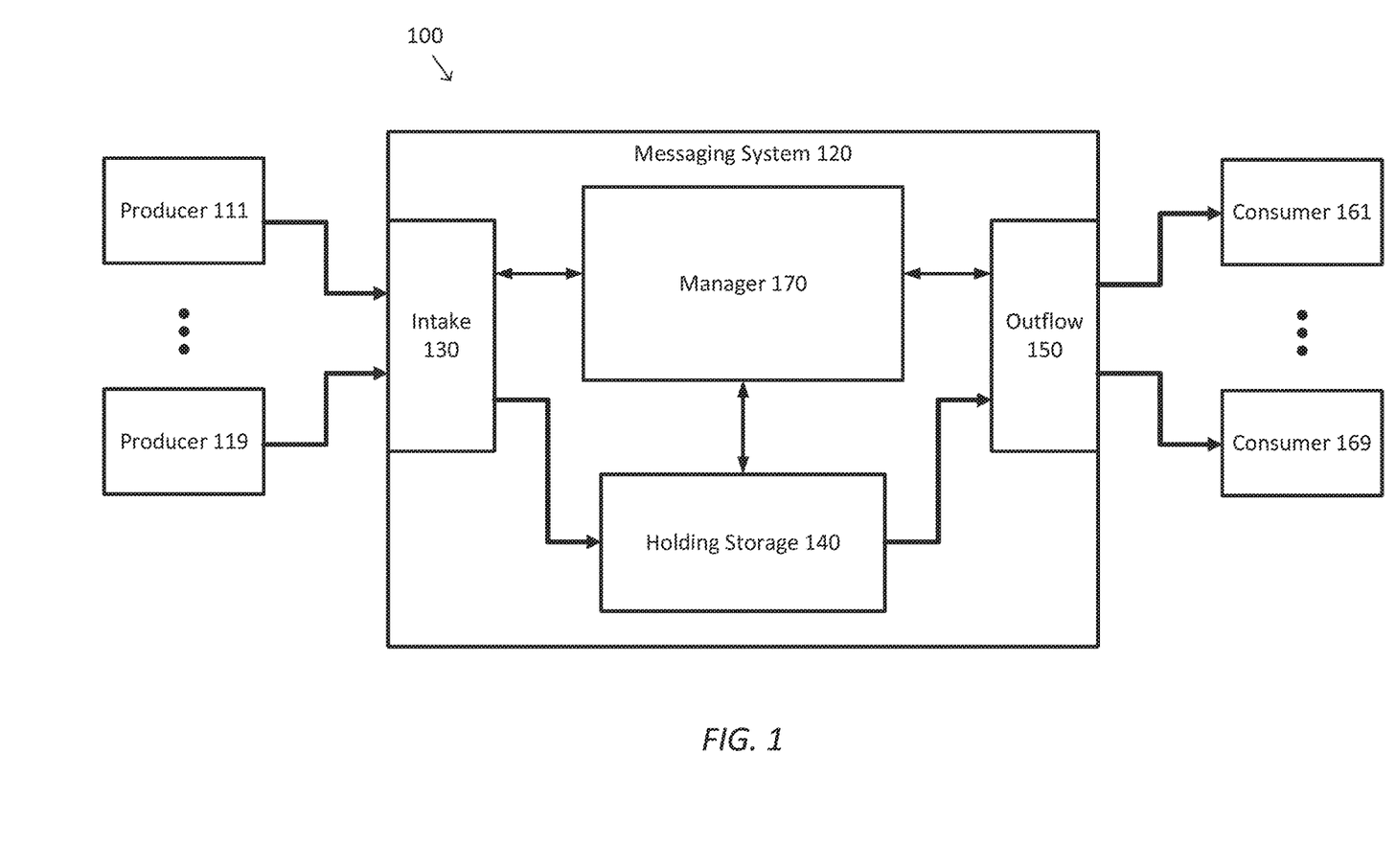
FIG. 1 is a simplified diagram of a messaging methodology according to some examples.

FIG. 1 is a simplified diagram of a messaging methodology 100 according to some examples. As shown in FIG. 1, messaging methodology 100 is built around a messaging approach using an intermediary that supports asynchronous messaging. In asynchronous messaging, the originator of a message and the recipient of the message do not need to rendezvous at the same time to exchange the message as is common with a telephone call where both the caller and the callee are on the phone at the same time. The intermediary sits between the originator and the recipient and provides, among other features, the ability to temporarily hold the message until the recipient can collect it. This approach is common with message-oriented middleware, such as the Java Messaging Service (JMS), email servers, and/or the like.

In messaging methodology 100, messages originate with a producer, such as any of the producers 111-119. When one of the producers 111-119 wants to transmit a message, it sends the message to an intermediary messaging system 120 via an intake interface 130 of messaging system 120. For example, messaging system 120 may implement intake interface 130 using an application programming interface (API), a collection of remote procedure calls, a collection of web services, and/or the like. Once the message is received by intake interface 130, the message is placed into a staging area or holding storage area 140 until it can be delivered. Holding storage area 140 may be implemented using a buffering system. For example, JMS supports two general approaches to the buffering of messages in holding storage area 140. A first approach, used for messages sent to a single recipient, uses a queue. As messages are received for the single recipient, they are placed into the queue for delivery. In some examples, multiple producers may place messages in the same queue for the single recipient. In some examples, even though a queue is used, the queue may not use a first-in first-out approach, thus allowing for delivery of messages from the queue in any order. A second approach, for messages sent to multiple recipients, uses a concept called a topic. A message placed in a topic is held there until the message is delivered to all the recipients and/or exceeds some maximum time in the topic. As with the queue, in order delivery is not required.

Messaging system 120 retains messages in holding storage area 140 until they are delivered. Messaging system 120 uses an outflow interface 150 to deliver the messages to one or more of the consumers 161-169. For messages with only a single recipient, the messages are delivered to only one of the consumers 161-169. For messages with multiple recipients, the messages are delivered to each of the designated consumers selected from consumers 161-169. In some examples, outflow interface 150 may use a pull-style approach for delivery where the messages are not delivered to the recipient(s) until a request is received from the corresponding consumers 161-169. This is a common approach with email, where an email client controls when incoming email is fetched from an email server. In some examples, outflow interface 150 may use a push-style approach for delivery where the messages are actively sent to the receiver(s) without waiting for a request from the corresponding consumers 161-169. As with intake interface 130, outflow interface 150 may be implemented using an application programming interface (API), a collection of remote procedure calls, a collection of web services, and/or the like.

Messaging system 120 may also include a messaging system manager 170. Messaging system manager 170 may be coupled to intake interface 130, holding storage area 140, and outflow interface 150 and may further be responsible for managing intake interface 130, holding storage area 140, and outflow interface 150. Messaging system manager 170 may include a user interface (not shown) that may be used to support configuration and management of messaging system 120.

As discussed above and further emphasized here, FIG. 1 is merely an example which should not unduly limit the scope of the claims. One of ordinary skill in the art would recognize many variations, alternatives, and modifications. In some examples, even though producers 111 and 119 are shown separate from consumers 161-169, producers may be consumers and consumers may be producers. For example, the same email client may be both a producer and consumer of email messages.

Figure 2:
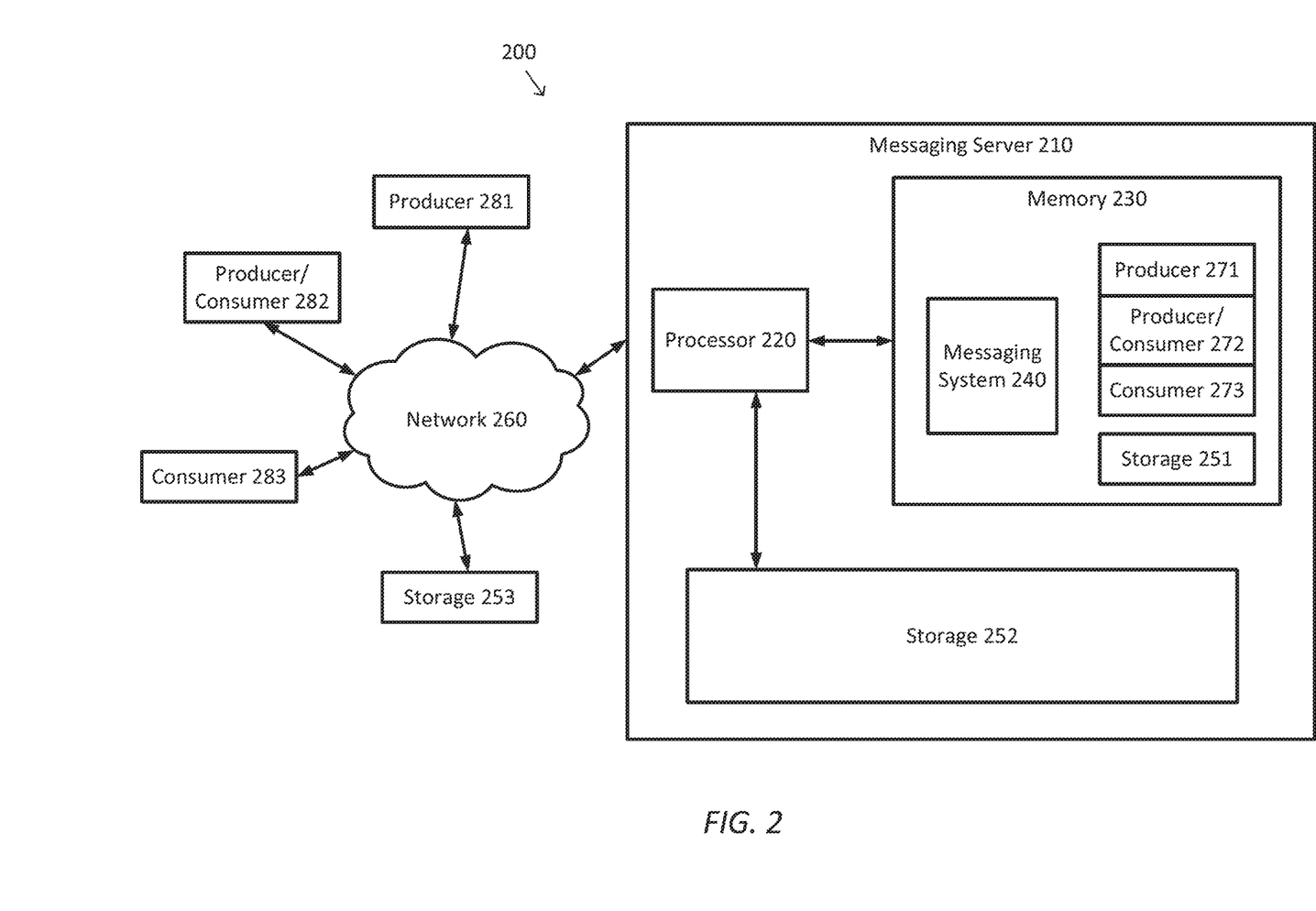
FIG. 2 is a simplified diagram of a computing system according to some examples.

FIG. 2 is a simplified diagram of a computing system 200 according to some examples. As shown in FIG. 2, computing system 200 illustrates a representative example of how a messaging methodology, like messaging methodology 100 may be implemented. Computing system 200 includes a messaging server 210. In some examples, messaging server 210 may be a standalone workstation, a cluster, a production server, within a virtual machine, and/or the like. Messaging server 210 includes a processor 220 coupled to memory 230.

In some examples, processor 220 may control operation and/or execution of hardware and/or software on messaging server 210. Although only one processor 220 is shown, messaging server 210 may include multiple processors. Memory 230 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Memory 230 may be used to store a messaging system 240. In some examples, messaging system 240 may be consistent with messaging system 120. Messaging system 240 includes one or more interfaces for the intake and outflow of messages from producers and consumers. Messaging system 240 further includes the ability to access one or more storage areas that may be used to support a holding storage area such as holding storage area 140. Memory 230 may also be used to store producers and/or consumers of messages. Several representative producers and consumers are shown in FIG. 2 including a producer 271, a producer/consumer 272, and a consumer 273. Each of producer 271 and producer/consumer 272 may use messaging system 240 to send messages. Each of producer/consumer 272 and consumer 273 may use messaging system 240 to receive messages. Memory 230 may further include a storage area 251 that may be used by messaging system 240 as part of its holding storage area. Although not explicitly shown in FIG. 2, messaging system 240, producer 271, producer/consumer 272, consumer 273, and storage 251 may be hosted in one or more virtual machines and/or Java virtual machines running on messaging server 210.

Messaging server 210 may further include one or more storage devices 252 coupled to processor 240. Each of the one or more storage devices 252 may include any kind of storage medium or machine-readable media. Some common forms of machine readable media suitable for the storage 150 may include floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. Any of the storage devices 252 may be used by messaging system 240 as part of its holding storage area.

Messaging server 210 and messaging system 240 may also provide messaging services to producers and consumers outside of messaging server 210. As shown in FIG. 2, messaging server 210 may be coupled to a network 260. Network 260 may be any kind of network including a local area network (LAN), such as an Ethernet, and/or a wide area network (WAN), such as the internet. Several representative producers and consumers outside of messaging server 210 are shown in FIG. 2 including a producer 281, a producer/consumer 282, and a consumer 283. Each of producer 281 and producer/consumer 282 may use messaging system 240 to send messages. Each of producer/consumer 282 and consumer 283 may use messaging system 240 to receive messages.

Further coupled to messaging server 210 using network 260 are one or more storage devices 253. Each of the storage devices 253 may be any kind of network accessible storage including a storage area network (SAN), a network-attached storage (NAS), a storage grid such as the JBoss® Data Grid provided by Red Hat, Inc., a database server, and/or the like. Any of the storage devices 253 may be used by messaging system 240 as part of its holding storage area.

Although not explicitly shown in FIG. 2, producer 281, producer/consumer 282, consumer 283, and storage 253 may be hosted in the same and/or more than one workstation, server, and/or computing device. Each may further be hosted in one or more virtual machines and/or Java virtual machines running on the workstations, servers, and/or computing devices.

Figure 3:
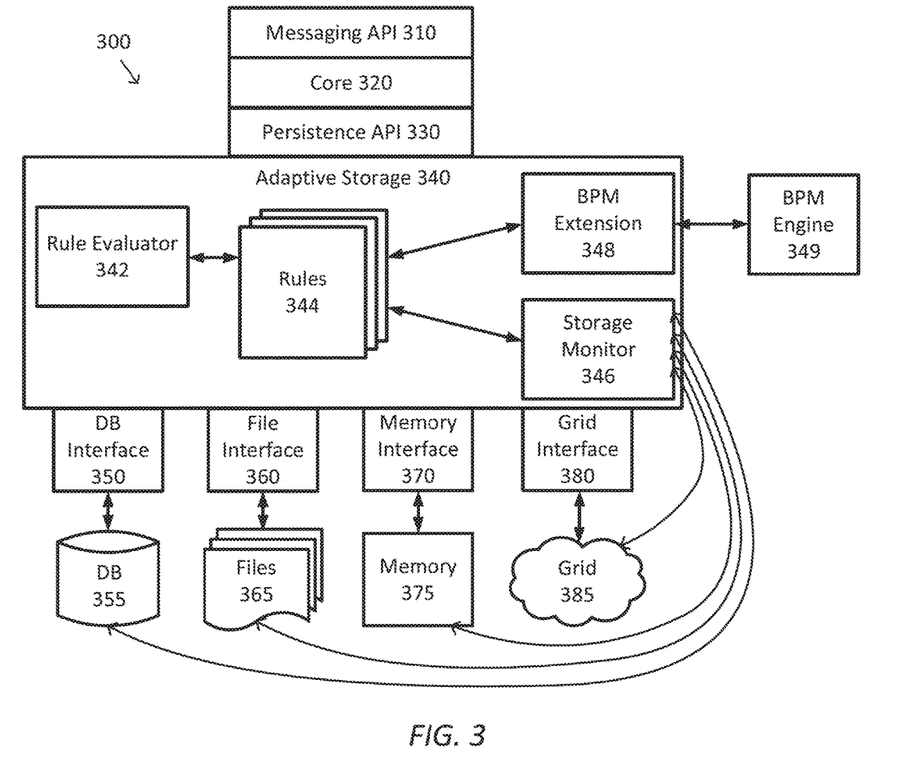
FIG. 3 is a simplified diagram of an implementation stack for a messaging system according to some examples.

FIG. 3 is a simplified diagram of an implementation stack 300 for a messaging system according to some examples. As shown in FIG. 3, a messaging system, such as messaging system 120 and/or 240 may be implemented using a layered implementation stack similar to implementation stack 300. Implementation stack 300 may be implemented using a combination of hardware and software and includes a messaging API 310, a core layer 320, a persistence API 330, and/or an adaptive storage layer 340.

Messaging API 310 may generally present an abstracted interface to support the exchange of messages between producers and consumers, such as those shown in FIGS. 1 and 2. In some examples, messaging API 310 may include the functionality of intake interface 130 and outflow interface 150. Although characterized as an API in FIG. 3, messaging API 310 may also include the ability to handle message intake and/or outflow using remote procedure calls, web service calls, and/or the like.

Core layer 320 includes much of the basic features for the messaging system such as the communication models used by the messaging system as well as the other functions of the system. For example, when the messaging system is JMS, core layer 320 may provide the basic functionality for implementing queues and topics as well as directing messages to and from the holding storage area using persistence API 330. Persistence API 330 provides an abstract interface making storage requests that include allocation, reading, writing, and/or the like. Persistence API 330 forwards the storage requests to the adaptive storage layer 340 where the implementation of the actual storage used by the holding storage area takes place.

Adaptive storage layer 340 uses a rule-based approach to make decisions regarding the type of holding storage used for each message. Adaptive storage layer 340 includes a rule evaluator 342 to choose a type of storage. Rule evaluator 342 evaluates a set of storage selection rules 344 to determine the best type of storage within the holding storage area to use for each message based on properties of the message, current storage conditions, and other appropriate factors. The current storage conditions are evaluated by storage monitor 346 that actively monitors the use and status of each of the storage types and mechanisms that are part of the holding storage area. The set of storage selection rules 344 may be generated by a user of the messaging system such as a system administrator, an information technologist, an end user, and/or the like. Additionally, rules may also be supplied by other systems such as a business process management (BPM) system. The BPM communicates with a BPM extension 348 that may add, remove, and/or modify rules within the set of storage selection rules 344. The BPM may additionally use a BPM engine 349 to access the BPM extension 348. Representative algorithms and methodologies used by rule evaluator 342 and the set of storage selection rules 344 are discussed in greater detail with respect to FIGS. 4-6.

In order to support its primary purpose of selecting an appropriate type of storage for use in the holding storage area, adaptive storage layer 340 provides interfaces to each of the various kinds of storage devices and mechanisms that may be used to store messages in the holding storage area. FIG. 3 includes four representative storage types that may form part, or possibly even all, of the storage used by the holding storage area. Other storage types and interfaces may also be used by adaptive storage layer 340.

A first of the four representative interfaces is a database interface 350. Database interface 350 allows adaptive storage layer 340 to store and retrieve messages in one or more databases such as a representative database 355. Use of databases for portions of the holding storage area provides several advantages. The access interface to databases, e.g., Structured Query Language (SQL), Open Database Connectivity (ODBC), and/or Java Database Connectivity (JDBC), is well understood. Databases further provide convenient mechanisms for including data consistency. Databases are also easily shared between servers, workstations, and messaging systems providing high availability to messages stored in the databases. Databases, however, typically have a higher overhead than other storage types, which may impact the performance of a messaging system using databases in the holding storage area. Databases may also impose size limitations that may limit the ability of the messaging system and the adaptive storage layer 340 to make dynamic adjustments to the size of the database.

A second of the four representative interfaces is a file interface 360. File interface 360 may be used to store messages in one or more files 365 in one or more file systems. File systems often provide storage that is faster than that provided by databases and generally include well-understood access mechanisms. Files and file systems may also be shared between servers, workstations, and/or messaging systems, but the sharing mechanisms, from the perspective of the adaptive storage layer, are typically more complex than those used with databases. Networked storage using SANs and NAS are also typically expensive. Files and file systems may also make search and selection among messages stored in the files 365 more complicated unless file interface 360 also maintains suitable data structures for identifying and locating messages.

A third of the four representative interfaces is a memory interface 370 for accessing memory 375. Use of memory 375 for storing messages in the holding storage area is typically the fastest storage approach, but is often the most expensive per stored byte. Memory 375 may also be difficult to share between servers, workstations, and messaging systems. Memory 375 may also be more limited in size and may also be susceptible to catastrophic loss when volatile memory is used.

A fourth of the four representative interfaces is a grid interface 380 for accessing a storage grid 386. Storage grid 385 typically includes a memory storage array distributed across multiple servers. For example, storage grid 385 may be a JBoss® Data Grid provided by Red Hat, Inc. Storage grid 385 provides many of the same advantages as memory 375 such as fast access while also providing sharing between servers, workstations, and messaging systems that more closely matches that of database and/or file systems.

Depending upon the types of storage made available to adaptive storage layer 340 for implementation of the holding storage layer, adaptive storage layer may include one or more interfaces with each interface selected from a group consisting of the database interface 350, file interface 360, memory interface 370, grid interface 380, and/or the like. In some examples, more than one of a particular interface may be used and one or more of the interface types may be omitted. Additionally, as each type of storage is made available to the holding storage area, storage monitor 346 is coupled to the storage so that it may monitor the status of the storage.

By using adaptive storage layer 340, the messaging system may be able to select the type of storage most appropriate for a message that is to be placed into the holding storage area. Messages with different properties may be directed to the storage type most suitable for each message based on the properties of the message. A small message may, for example, be better suited for storage in memory, whereas a large message may be better placed in a file. By selecting the storage type on an individual message basis, adaptive storage layer 340 may be able to better optimize the holding storage area as the best storage type for each message may be selected rather than trying to use the same storage type for all messages. In addition, the inclusion of storage monitor 346 permits the choice of storage to vary dynamically as conditions within the various storage options change. For example, a storage type with limited free space may be disfavored during the storage type selection process.

Figure 4:
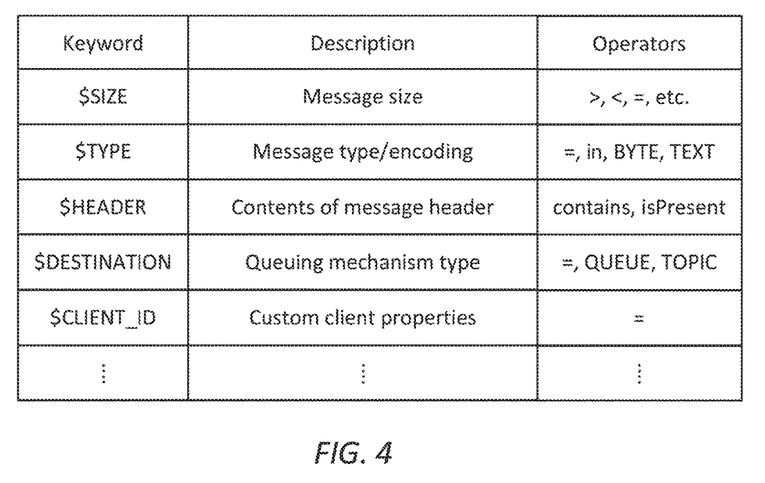
FIG. 4 is a simplified diagram listing a set of representative keywords that may be used by a set of storage selection rules according to some examples.

FIG. 4 is a simplified diagram listing a set of representative keywords that may be used by a set of storage selection rules according to some examples. As shown in FIG. 4, various keywords may be used in a storage selection rule syntax to access information and/or metadata associated with individual messages. Each of the keywords may be used along with one or more operators and/or access methods within a storage selection rule.

A $SIZE keyword may be used to base a storage selection rule on the size of the message to be placed into the holding storage area. Because $SIZE is a number, the standard comparison operators may be used including greater than, less than, equal to, and/or the like. For example, $SIZE may be used to draft storage selection rules that favor storage in memory for smaller messages. In some examples, the $SIZE keyword may indicate the size of a message in kilobytes.

A $TYPE keyword may be used to base a storage selection rule on the type of a message to be placed into the storage of the holding storage area. The $TYPE keyword may be used to determine a type of basic data used within the message such as a raw BYTE-based approach or a character-based TEXT approach. The $TYPE keyword may be used with a comparison operator such as equals or may be used with basic set operators, such as in, when more than one type may be compared against.

A $HEADER keyword may be used to base a storage selection rule on information included in the header or headers of a message. The $HEADER keyword may be used to examine one or more fields of the headers of the message using operators such as contains to look for specific values or text strings or isPresent to determine whether various header fields are present.

A $DESTINATION keyword may be used to base a storage selection rule on the type of queuing mechanism for the message. For example, when the adaptive storage layer 340 is used with JMS, the $DESTINATION keyword may be used to determine whether the message is to be stored in a QUEUE for one-to-one messaging or a TOPIC for one-to-many messaging. The $DESTINATION keyword may be used with comparison operators such as equals.

A $CLIENT_ID keyword may be used to base a storage selection rule on custom client-specific properties. For example, a messaging system used with both restricted operating system messages and less restricted user process messages may use the $CLIENT_ID keyword to mark certain messages as privileged so that only certain consumers may be have the ability to access the messages. The $CLIENT_ID keyword may be used with comparison operators such as equals.

According to some examples, other keywords (not shown) may be used. In some examples, one or more keywords for evaluating a desired quality of service (QoS) of a message may be used. In some examples, one or more keywords for determining a producer and/or consumer for a message may be used. In some examples, one or more keywords for evaluating the performance of the queuing storage mechanisms may be used. In some examples, one or more keywords for allowing a producer to select the holding storage type may be used.

The keywords and their various operators may also be used to develop compound and/or complex storage selection rules using Boolean operators and/or parenthesis as is commonly found in many high-level programming and/or scripting languages. For example, a compound storage selection rule may use the AND (&&). the OR (||), the NOT (!), and/or other Boolean operators to create logical combinations of keywords and keyword tests.

Figure 5:
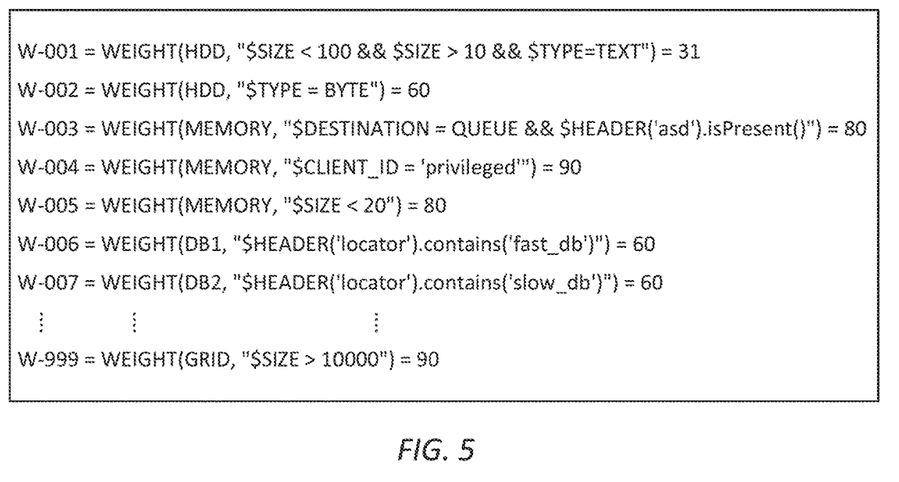
FIG. 5 is a simplified diagram listing a set of storage selection rules according to some examples.

FIG. 5 is a simplified diagram listing a set of storage selection rules according to some examples. In some examples, the set of storage selection rules is the set of storage selection rules 344. As shown in FIG. 5, the keywords of FIG. 4 may be used to describe a set of storage selection rules based on the properties of a message being evaluated. Each of the storage selection rules in FIG. 5 assigns a weight to a particular one of the storage types available for use in the holding storage area. The general syntax for each storage selection rule is "<rule_id>=WEIGHT(<storage>, "<Boolean expression>") =<value>". The <rule id> field identifies each specific rule. The <storage> field indicates the type of holding storage device that the rule applies to. The <Boolean expression> field may be built around the keywords and operators of FIG. 4. The <value> field is the weight or strength assigned to each rule. In the examples, of FIG. 5, <value> filed is a number from 0 to 100 inclusive, with 100 representing a highest weighted rule and 0 a lowest weighted rule. The higher a rule weight, the more influence it has when being evaluated by rule evaluator 342.

Rule W-001 applies to a holding storage device of type hard disk drive as noted by the use of HDD for the <storage> field. Rule W-001 indicates that when a message is of moderate length between 10 and 100 in size ($SIZE<100 && $SIZE>10) and the message is encoded using test ($TYPE=TEXT) that there is a somewhat weak preference for using a hard disk drive as the holding storage for the message, as designated by the weight of 31. Rule W-001 also shows the use of the Boolean AND operator (&&) for creating a compound <Boolean expression>. In contrast, rule W-002 shows a somewhat stronger preference for use of a hard disk drive for the holding storage for messages that are encoded using bytes ($TYPE=BYTE) as designated by the higher weight of 60.

Rules W-003, W-004, and W-005 apply to use of MEMORY for the holding storage device. Rule W-003 designates a high weight of 80 for the use of memory for the holding storage for messages that are being placed in a queue ($DESTINATION=QUEUE) for a single consumer and further includes a test that the header for the message includes an "asd" field ($HEADER('asd').isPresent( )). Rule W-004 designates a very high weight of 90 for the use of memory when a message is tagged as privileged ($CLIENT_ID='privileged'). Rule W-005 also designates a high weight of 80 for the use of memory for shorter messages ($SIZE<20).

Rules W-006 and W-007 apply to use of databases for the holding storage device. Rule W-006 designates a somewhat strong weight of 60 for a first database (DB1) when the "locator" header of the message includes the string "fast_db" ($HEADER('locator').contains ("fast_db")). Rule W-007 designates an equivalent weight of 60 when the "locator header" contains "slow_db". In some examples, rules like W-006 and/or W-007 may make it possible for the producer of a message to designate a preference for the holding storage type.

Rule W-999 designates a very high weight of 90 for the use of a storage grid (GRID) for very large messages ($SIZE>10000). Although only eight storage selection rules are shown in FIG. 5, any number of storage selection rules may be used including as from few as one to potentially even hundreds, thousands, or even more.

A review of rules W-001 through W-999 also shows that mutual exclusion is not required between the rules. For example, rule W-001 applies to messages between 10 and 100 in size whereas rule W-005 applies to messages less than 20 in size. Thus, a message of 15 in size and encoded using text would satisfy both rules. For such a message, rule W-001 would show a weak preference (31) for the use of a hard disk drive, and rule W-005 would show a strong preference (80) for use of memory. As will be discussed in further detail below, rule evaluator 342 is responsible for resolving any potential conflicting recommendations and/or preferences expressed in the storage selection rules. By allowing for potentially conflicting recommendations in the storage selection rules, the creator of the rules (e.g., an administrator and/or the BPM engine) may draft simple rules in isolation without having to worry about mutual exclusion among the rules and/or the order of rule evaluation.

Figure 6:
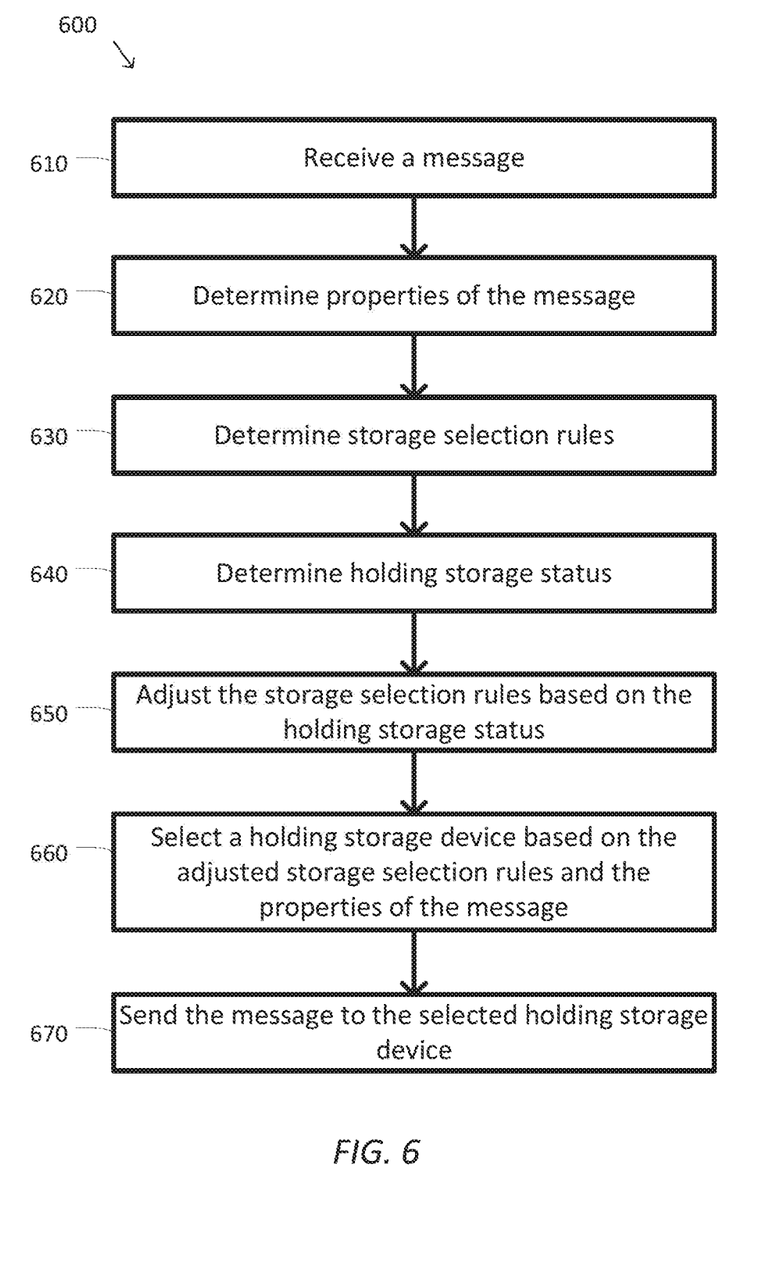
FIG. 6 is a simplified diagram of a method of holding storage selection according to some examples.

FIG. 6 is a simplified diagram of a method 600 of holding storage selection according to some examples. In some examples, one or more of the processes 610-670 of method 600 may be implemented, at least in part, in the form of executable code stored on non-transient, tangible, machine readable media that when run by one or more processors (e.g., the processor 220 of messaging server 210) may cause the one or more processors to perform one or more of the processes 610-670. In some examples, method 600 may be used by adaptive storage layer 340 and rule evaluator 342 to select a holding storage type for messages being processed by a messaging system.

At a process 610, a message is received. In some examples, the message may be received by messaging system 120 via intake interface 130. In some examples, the message may be received by messaging API 310. In some examples, the message may be received from any of producers 111-119, 271, or 281 or producer/consumers 272 or 282. In some examples, the message may be passed to an adaptive storage layer, such as adaptive storage layer 330, to determine a type of holding storage in which the message should be stored pending delivery to one or more consumers such as consumers 161-169, 273, and/or 283 and/or producer/consumers 272 and/or 282.

At a process 620, properties of the message are determined. The message received during process 610 is examined to determine one or more properties and/or metadata of the message. In some examples, some of the one or more properties may be determined by examining the headers of the message. In some examples, some of the properties may be determined by computing one or more metrics on the messages. In some examples, some of the properties may be determined based on other processing performed on the message by the messaging system. In some examples, the one or more properties may include a size of the message, an encoding type of the message, contents of the header, a queuing mechanism for the message, client properties of the message, and/or the like. In some examples, the one or more properties may be associated with the keywords of FIG. 4.

At a process 630, storage selection rules are determined. A collection of storage selection rules, such as the storage selection rules 344 are determined. In some examples, the storage selection rules are determined by the adaptive storage layer based on information received from one or more sources. In some examples, one or more of the storage selection rules may be received from a user of the messaging system, such as an administrator. In some examples, one or more of the storage selection rules may be received from a BPM engine, such as BPM engine 349, using a BPM extension, such as BPM extension 348. In some examples, one or more of the storage selection rules may be received from other systems and/or sources. In some examples, the storage selection rules may be similar to the storage selection rules of FIG. 5. In some examples, each of the storage selection rules assigns a weighting to one of the possible storage types for holding storage based on the properties of the message determined during process 620. According to certain examples, the storage selection rules may be updated dynamically and/or periodically so that the storage selection rules determined during process 630 may be different as different messages are received. In some examples, the storage selection rules may be updated as often as every 10 ms or less and/or as infrequently as several minutes or longer.

At a process 640, holding storage status is determined. In some examples, the adaptive storage layer may use a storage monitor, such as storage monitor 346, to determine the holding storage status. The storage monitor may monitor and/or communicate with each of the holding storage devices available for use as holding storage in order to determine the status of each of the holding storage devices. According to some examples, the storage monitor may evaluate a utilization of each of the holding storage devices to determine an amount of storage space still available on the respective holding storage device. In some examples, the storage monitor may determine the status based on a percentage of storage space available and/or an amount of storage space available. In some examples, when the holding storage device is memory, the status of memory may be based on space available in both the memory itself and the virtual swap space when virtual memory is used. In some examples, when the holding storage device is accessed via a network, such as network 260, network latency, throughput, and/or other network metrics may be used to determine the status of the holding storage device. In some examples, the status may be determined as a composite of more than one factor. In some examples, the holding storage status may be updated periodically by the storage monitor to reflect the changing status and usage of each of the holding storage devices. In some examples, the holding storage status may be updated as often as every 10 ms or less and/or as infrequently as several minutes or longer based on the type and/or location of each of the holding storage devices.

According to some examples, the storage monitor may assign negative status scores to each of the holding storage devices based on the determined status. In some examples, the determined status for each holding storage device may vary from zero to negative 100, with the more negative values indicating a status that makes the corresponding holding storage device less desirable. As an example, the storage monitor may determine the following status values: STATUS(HDD)=−10, STATUS(MEMORY)=0, STATUS(DB1)=−20, STATUS(DB2)=0, and STATUS(GRID)=−30 indicating that memory and database 2 have the best status and the storage grid has the worst status. In some examples, the status for the storage grid may reflect high network latency. In some examples, the status for the hard disk drive may reflect a higher number of read and/or write requests being currently handled by the hard disk drive.

At a process 650, the storage selection rules are adjusted based on the holding storage status. Using the holding storage status determined during process 640, each of the storage selection rules determined during process 630 may be adjusted. In some examples, this allows the status of each of the holding storage devices to affect the selection of the holding storage device for the current message. In some examples, the weight of each of the storage selection rules may be adjusted by adding the holding storage status value of the respective holding storage device to each storage selection rule for that holding storage device. For example, using the storage selection rules of FIG. 5 and the sample status values described above, rule W-001 would have an adjusted weight of 21 (31 from the rule minus 10 from the status of the hard disk drive), rule W-003 would have an adjusted weight of 80 (80 from the rule minus 0 from the status of the memory), rule W-999 would have an adjusted weight of 60 (90 from the rule minus 30 from the status of the storage grid), and so forth.

At a process 660, a holding storage device is selected based on the adjusted storage selection rules and the properties of the message. Using the storage selection rules as adjusted by the holding storage status during process 650 and the message properties determined during process 620, the adjusted storage selection rules are evaluated to select the holding storage device that is to be used as holding storage for the message received during process 610. Using a rule evaluator, such as rule evaluator 342, the adjusted storage selection rules are evaluated to select a preferred choice for the holding storage device. Based on the properties and metadata of the message, the <Boolean expression>s in the storage selection rules may be evaluated to determine storage selection rules that are applicable to the message. In some examples, the rule evaluator accounts for any potential contradictions in the rules as discussed above with respect to the storage selection rules of FIG. 5. Numerous rule evaluation approaches are possible.

According to some examples, the holding storage device may be selected by finding the single most applicable of the adjusted holding storage rules. In some examples, the adjusted holding storage rules are sorted in order of descending weight. In some examples, the adjusted holding storage rules may be maintained in a data structure that automatically orders the storage selection rules based on the adjusted weights. Once the storage selection rules are ordered, the holding storage rules are evaluated in order from highest weight to lowest. The first rule whose <Boolean expression> matches the message properties is used to select the holding storage device based on the <storage> field in the respective rule. For example, using the storage selection rules of FIG. 5 as adjusted in the example above, the storage selection rules and their weights are sorted in the following order: W-004=90, W-003=80, W-005=80, W-007=60, W-999=60, W-002=50, W-006=40, and W-001=21. A message with properties including a size of 10, no "asd" header, and not designated as "privileged" would result in rules W-004 and W-003 failing before rule W-005 would match, resulting in selection of memory for the holding storage device. If the message, however, has a size of 35, is encoded using text, and does not contain a "locator" header, rule W-002 would be the first rule to match and the hard disk drive would be selected as the holding storage device. If no storage selection rule matches the properties of the message, a default holding storage device may be selected. In some examples, the default holding storage device may be configurable by the administrator. In some examples, the default holding storage device may be selected based on the holding storage status determined during process 640.

The sorting and ordered evaluation approach may provide certain advantages during the holding storage device selection of process 660. In some examples, a minimum number of storage selection rules may be evaluated to find the matching storage selection rule with the highest weight. In some examples, the computational overhead of sorting the storage selection rules may be lower than the computational overhead saved by evaluating the storage selection rules in sorted order. In some examples, when the storage selection rules are adjusted at a rate less often than messages are received (e.g., because the processes 630 and/or 640 are only performed periodically), the sorted storage selection rules may be used in conjunction with multiple messages without having to re-sort the storage selection rules with each message received.

According to some examples, the holding storage device may be selected by aggregating the weights of each of the applicable adjusted holding storage rules. In some examples, the weights each of the adjusted holding storage rules whose <Boolean expression> evaluates to true based on the message properties determined during process 620 (i.e., the applicable rules) is included in the selection of the holding storage device. In some examples, a weighted sum, an average, and/or any similar aggregating function may be used to determine the holding storage device with the highest aggregated weight. Using the running example of adjusted storage selection rules, when an average is used and rules W-001, W-002, W-003, W-004, and W-007 are matched, the hard disk drive would have an aggregate weight of 35.5=(21+50)/2, memory would have an aggregate weight of 85=(80+90)/2, and DB2 would have an aggregate weight of 60=60/1. As a consequence, memory would be selected as the holding storage device. In some examples, the aggregation may include a bias in favor of holding storage devices with more storage selection rules that are applicable.

According to some examples, the holding storage device may be selected using other combination strategies for the applicable adjusted holding storage rules. In some examples, a fuzzy logic inference engine and/or some other rule-based system may be used to combine the applicable adjusted holding storage rules.

At a process 670, the message is sent to the selected holding storage device. The adaptive storage layer sends the message received during process 610 to the holding storage device selected during process 660. For example, the adaptive storage layer may use an interface for the selected holding storage device to send the message to the selected holding storage device. In some examples, the interface may be database interface 350, file interface 360, memory interface 370, storage grid interface 380, and/or the like. Once sent to the selected holding storage device, the message may be recorded in a queuing mechanism, such as a queue and/or a topic. In some examples, the message is retained in the selected holding storage device until the message is retrieved and sent to the designated consumer(s).

Some examples of messaging system 120 and/or 240, and/or adaptive storage layer 340 may include non-transient, tangible, machine readable media that include executable code that when run by one or more processors (e.g., processor 220) may cause the one or more processors to perform the processes of method 600 as described above. Some common forms of machine readable media that may include the processes of method 600 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method of selecting a holding storage device for messages received on a service bus, the method comprising:
   receiving a message at the service bus, the message having one or more properties;
   determining one or more storage selection rules based on the one or more properties of the message;
   determining a plurality of statuses for one or more candidate holding storage devices, each candidate holding storage device having a storage type and a status;
   determining a plurality of respective weight values for the one or more candidate holding storage devices, the determining based on respective weights for the one or more storage selection rules as adjusted by respective statuses in the plurality of statuses for the candidate holding storage devices;
   selecting a holding storage device from the one or more candidate holding storage devices based on the plurality of respective weight values; and
   storing the message in the selected holding storage device.

2. The method of claim 1, wherein selecting the holding storage device further comprises selecting the holding storage device according to a storage selection rule whose adjusted weight value for the selected holding storage device is a largest from among the one or more storage selection rules that match the one or more properties of the message.

3. The method of claim 1, wherein the service bus complies with Java Messaging Service (JMS).

4. The method of claim 1, wherein one of the one or more properties of the message is a speed property.

5. The method of claim 4, wherein the speed property identifies use of a fast or a slow holding storage device.

6. The method of claim 1, further comprising:
   retrieving the message from the selected holding storage device; and
   sending the message to a recipient.

7. The method of claim 1, wherein each of the one or more properties of the message are a property selected from a group consisting of a size of the message, an encoding type of the message, a desired queuing mechanism for the message, one or more contents of a header of the message, a sender of the message, a receiver of the message, and a client property of the message.

8. The method of claim 1, wherein the storage type is selected from a group consisting of a database, a file, a file system, a memory, and a storage grid.

9. The method of claim 1, wherein the status is based on an amount of available storage space or a property of a network coupling the candidate holding storage device to the service bus.

10. The method of claim 1, wherein the plurality of statuses of the candidate holding storage devices are updated periodically.

11. A service bus comprising:
one or more holding storage devices, each having a storage type and a status;
a hardware memory storing a plurality of storage selection rules each comprising a weight value; and
one or more processors coupled to the hardware memory and configured to perform steps comprising:
receiving a message at the service bus, the message having one or more properties;
determining one or more storage selection rules from the plurality of storage selection rules based on the one or more properties of the message;
determining a plurality of statuses for the one or more holding storage devices;
determining a plurality of respective weight values for the one or more holding storage devices, the determining based on respective weights for the one or more storage selection rules as adjusted by respective statuses in the plurality of statuses for the holding storage devices;
selecting a holding storage device from the one or more holding storage devices based on the plurality of respective weight values; and
storing the message in the selected holding storage device.

12. The service bus of claim 11, wherein selecting the holding storage device further comprises selecting the holding storage device according to a storage selection rule whose adjusted weight value for the selected holding storage device is a largest from among the one or more storage selection rules that match the one or more properties of the message.

13. The service bus of claim 11, wherein the service bus complies with Java Messaging Service (JMS).

14. The service bus of claim 11, wherein one of the one or more properties of the message is a speed property.

15. The service bus of claim 14, wherein the speed property identifies use of a fast or a slow holding storage device.

16. A non-transitory machine-readable medium comprising a plurality of machine-readable instructions which when executed by one or more processors associated with a service bus are adapted to cause the one or more processors to perform a method comprising:
receiving a message at the service bus, the message having one or more properties;
determining one or more storage selection rules based on the one or more properties of the message;
determining a plurality of statuses for one or more candidate holding storage devices, each candidate holding storage device having a storage type and a status;
determining a plurality of respective weight values for the one or more candidate holding storage devices, the determining based on respective weights for the one or more storage selection rules as adjusted by respective statuses in the plurality of statuses for the candidate holding storage devices;
selecting a holding storage device from the one or more candidate holding storage devices based on the plurality of respective weight values; and
storing the message in the selected holding storage device.

17. The non-transitory machine-readable medium of claim 16, wherein selecting the holding storage device further comprises selecting the holding storage device according to a storage selection rule whose adjusted weight value for the selected holding storage device is a largest from among the one or more storage selection rules that match the one or more properties of the message.

18. The non-transitory machine-readable medium of claim 16, wherein the service bus complies with Java Messaging Service (JMS).

19. The non-transitory machine-readable medium of claim 16, wherein one of the one or more properties of the message is a speed property.

20. The non-transitory machine-readable medium of claim 19, wherein the speed property identifies use of a fast or a slow holding storage device.

* * * * *